United States Patent Office 2,773,885
Patented Dec. 11, 1956

2,773,885

STEROIDS OF THE ERGOSTA SERIES

Gerald D. Laubach, Jackson Heights, and Eric C. Schreiber, Hicksville, N. Y., assignors to Chas. Pfizer & Co., Inc., Brooklyn, N. Y., a corporation of Delaware No Drawing. Application July 15, 1953,
Serial No. 368,199

14 Claims. (Cl. 260—397.2)

This invention is concerned with the preparation of certain valuable steroid compounds. In particular, it is concerned with the preparation of a new class of 11-keto steroid compounds which are of use in the synthesis of biologically active compounds such as cortisone.

The introduction of an oxygen function at the 11-position of the steroid molecule is an essential part of most syntheses of cortisone and related steroids. Since practically all of the naturally available steroid compounds which may be considered as starting materials in such a synthesis have no oxygen function at the 11-carbon atom, it is essential that economical methods be developed for conducting such reactions.

In copending patent application Serial No. 224,676, filed on May 4, 1951, by Gerald D. Laubach, it has been shown that 8,9-unsaturated steroid compounds having a peroxide bridge in the C ring of the nucleus at the 11,14-positions may be readily prepared from the 8(14),9(11)-unsaturated compounds. It is an object of the present invention to provide a method for converting such steroid peroxides directly to the corresponding 11-keto steroid compounds by a relatively simple procedure. A particular object is to obtain novel 8,9-unsaturated 11-keto steroids. A further object is to convert relatively cheap vegetable-type steroid starting materials to steroid intermediates bearing a keto group at the 11-position of the nucleus. These substances may be converted to valuable cortisone intermediates. In particular, it has been disclosed in the copending application filed on October 29, 1952, by Gerald D. Laubach et al. under Serial No. 317,576 that the 8,9-unsaturated-11-keto type compounds may be converted under certain hydrogenation conditions to known cortisone intermediates. An outline of these process steps have been disclosed in a published scientific paper appearing in the Journal of the American Chemical Society, vol. 75, pp. 1514–1515 (1953).

This is a continuation-in-part application based on application Serial No. 293,426, filed on June 13, 1952, by Gerald D. Laubach et al. It was there disclosed that contacting 8,9-nuclear unsaturated steroid 11,14-peroxides with alumina resulted in the formation of novel 8,9-nuclear unsaturated, 11-keto-14-hydroxy steroid compounds. Study of this reaction has now revealed that the alkaline surface of the alumina is responsible for the rearrangement rather than the alumina itself. When alumina (prepared in the usual manner by treating a solution of an aluminum salt with caustic) is washed with acid, there results the loss of its ability to carry out the rearrangement. Tests have disclosed that the alkaline material need not be present on the surface of alumina. Not only is the alkaline surface of the alumina capable of bringing about this rearrangement but also soluble, unsupported inorganic alkaline materials can also accomplish the same rearrangement.

The starting materials in this reaction may bear a double bond at other nuclear and/or side chain positions as well as at the 8,9-position, for instance, at the 6,7-position. Such additional double bonds in no way interfere with the reactions disclosed and claimed here. Furthermore, substituents at the 3-position of the steroid nucleus, such as keto, hydroxyl, groups readily hydrolyzable to keto (e. g. ketals formed with alcohols or glycols, such as methanol, ethanol and ethylene glycol) or groups readily hydrolyzable to hydroxyl (e. g. esters like the acetate, propionate, butyrate, etc. and ethers like methyl, ethyl, benzyl, etc.); short side chains at C10 and 13, etc. (cis or trans isomers); and groups at the 17-position of the nucleus, such as alkyl, alkenyl

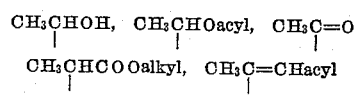

and groups attached at two points of the D ring, viz.

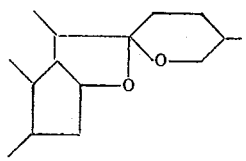

do not interfere with the reaction in any way.

The new process may be illustrated by the conversion of the C ring peroxide of isodehydroergosteryl acetate (ergosta-6,8,22-triene-3β-ol acetate 11,14-peroxide). The compound, ergosta-6,8,22-triene-11-one-3β,14-diol 3-acetate, is formed in good yield and may be readily isolated and purified.

In carrying out the conversion of the peroxide to the keto alcohol, the former is contacted with an inorganic alkaline material. This material may be in the form of a water- and organic solvent-insoluble material, such as alumina, or, it may be in the form of an alkaline material soluble in certain organic solvents, particularly lower aliphatic alcohols (e. g. those having up to about five carbon atoms in their primary chain) or mixtures of these with water. Among the alkaline materials of this nature which are useful are solutions of alkali metals such as sodium, potassium or lithium, particularly when dissolved in the lower alkanols. Also useful in the present process are alkali metal bicarbonates such as the sodium, potassium and lithium compounds; alkali metal carbonates such as the sodium, potassium and lithium compounds and alkali metal hydroxides such as the sodium, potassium and lithium compounds. These materials may be dissolved in a lower alkanol or in water mixed with a lower alkanol. It is not necessary that the inorganic alkaline material be completely soluble in the reaction medium. However, the compound should have some solubility in order to assure a reasonably rapid reaction. Alumina is, of course, quite insoluble in most organic solvents. Certain other solvents than the lower alkanols may be used for conducting the present reaction. These include lower ketones (acetone, methyl ethyl ketone, diethyl ketone, etc.), certain halogenated aliphatic compounds (chloroform, methylene chloride, dichlorethylene, etc.), glycols, such as ethylene glycol, propylene glycol and so forth. Less polar organic solvents such as aromatic hydrocarbons (benzene, toluene, etc.), ethers (diethyl ether, dioxane, etc.) and esters (ethyl acetate, etc.) may also be used. However, these are often less valuable and may undergo condensations which are undesirable. It is necessary, of course, that the steroid peroxide used as starting material possess an appreciable solubility in the reaction medium and that the solvent used not undergo a deleterious reaction wtih the inorganic alkaline material used to bring about the rearrangement of the peroxide. When alumina is used as the alkaline material for the reaction, various less polar organic solvents (e. g. ethers, esters, hydrocarbons, halogenated hydrocarbons, etc.) are preferred. The alumina in finely divided form is placed in contact with a solution of the steroid peroxide. This may be done by passing the solution through a column of the alumina at a controlled rate. The reaction is slower than in the case of the soluble alkalies and the use of more polar solvents decreases the conversion to the keto steroids. Since the product tends to be adsorbed rather strongly on the alumina, it may be necessary to elute with one of the more polar solvents to remove it.

In carrying out the present process it is preferred to use a minor proportion of the inorganic alkaline material and of the steroid peroxide as compared to the amount of solvent. The proportion of inorganic alkaline material to the peroxide used should be at least equimolecular. It may be found useful to employ an excess of the alkaline material in order to achieve reasonably rapid reaction. However, a lesser or greater proportion may often be used successfully. The concentration of the peroxide in the solvent is preferably rather low. For instance, a concentration of from about 0.1 to 10 grams of the peroxide per 100 milliliters of reaction medium is often found to be quite satisfactory. In conducting the reaction, a temperature from about 15° to the boiling point of the solvent is satisfactory. The maximum yield with a given peroxide, a given alkaline agent in a given solvent system will vary somewhat with the temperature used, the time of the reaction and other conditions. In general, the reaction is completed or an appreciable amount of the desired rearrangement product is formed at a time ranging from a few minutes to several hours. In some cases, the mixture is allowed to remain at the desired temperature for a day or more. However, if an elevated temperature is used, it is usually more satisfactory to terminate the reaction, in a relatively short time, that is, in from a fraction of an hour to a few hours. It should be noted that under the conditions for formation of the keto alcohols from the steroid peroxides other by-products or further reaction products of the keto alcohols may be formed. Thus, conditions within the scope described above must be chosen in which the yield of the desired product is at a maximum and the by-products are at a minimum.

Not only is the rearrangement process just described novel, but the keto alcohol steroid products which are formed thereby are also new and useful, as hereinbefore explained. These products are 8-unsaturated 11-keto-14-hydroxy steroid compounds, for instance 8- or 6,8-nuclear unsaturated steroids, having the general structure

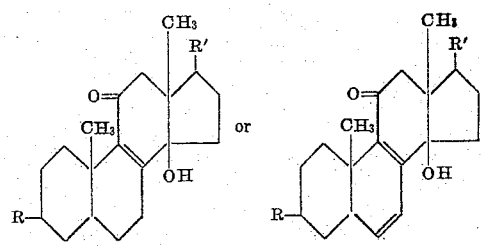

These may be, as previously mentioned, substituted at the 3-position (R) by keto, a group readily hydrolyzable to keto (e. g. a ketal), an hydroxyl or a group readily hydrolyzable to hydroxyl (e. g. an ester or ether), and at the 17-position (R') by a side chain of the class

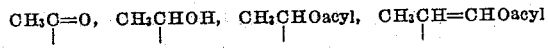

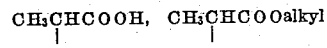

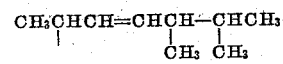

groups attached at two points of the D ring viz.

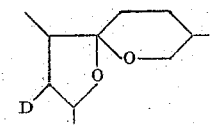

and so forth.

The 11-keto-14-hydroxy products of this treatment may, in turn, be converted by dehydration to a novel class of 8,14-nuclear unsaturated 11-keto steroid compounds. The presence of a 14-hydroxy group is often undesirable in the biologically active cortical steroid type compounds finally obtained, so that this second class of new products is also of great value as intermediates in cortisone synthesis. In yet a third operation the 14,15-double bond of these products may finally be selectively reduced by hydrogenation without affecting the 8,9-double bond. For some peculiar reason the 14,15 bond is preferentially saturated by this procedure; and 8,9-unsaturated, D-ring saturated 11-keto steroids are recovered.

This second phase of the 14-hydroxy removal may be illustrated by the dehydration of ergosta-6,8,22-triene-11-one-3β,14-diol 3-acetate. The product formed in this case is ergosta-6,8,14,22-tetraene-11-one-3β-ol acetate.

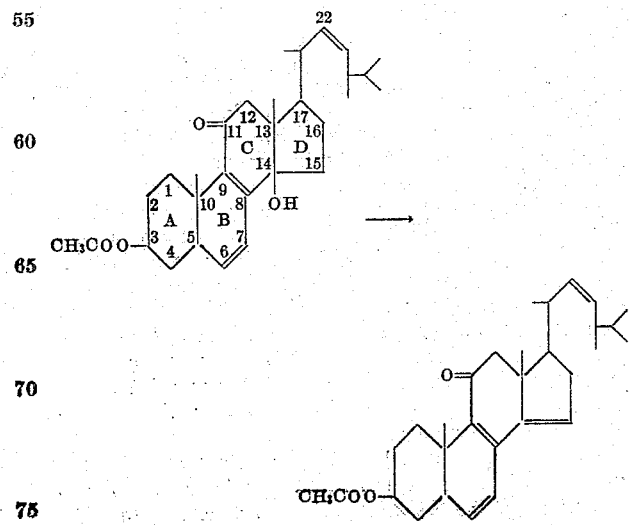

A variety of agents may be used for bringing about this dehydration, which is accomplished with remarkable ease. Satisfactory reagents include strong acids, acid anhydrides, and acid chlorides, both organic and inorganic, as well as various other acidic dehydrating agents like oxalic acid. Contacting the keto alcohols for a short time in the presence of a trace of iodine in a solvent will accomplish the reaction. Sometimes, too, heating the compound is sufficient to dehydrate it. Other reagents which are effective to dehydrate selectively at the 14,15-positions are acetic anhydride, thionyl chloride, sulfuric acid, toluenesulfonic acid, phosphorus oxychloride, phosphoric acid, and so forth. A solvent is best employed for conducting the reaction. Examples of these include alcohols, hydrocarbons, ethers, halogenated hydrocarbons, and generally the same solvents as are useful in the alkali-conversion. In the case of certain of the reagents, such as thionyl chloride or phosphorus oxychloride, a solvent may be dispensed with. The products formed may be recovered and purified by standard methods.

As previously indicated, a series of hitherto unknown compounds are formed by the dehydration. These are 8,14-nuclear unsaturated 11-keto steroids, of which especially useful examples are the 6,8,14-nuclear tri-unsaturated and 8,14-di-unsaturated-11-keto steroids. Such products, like the alkali rearranged materials previously described, generally have at the 3-position of the nucleus, a radical chosen from the group keto, groups readily hydrolyzable to keto (e. g. ketals), hydroxyl and groups readily hydrolyzable to hydroxyl (e. g. esters or ethers) and at the 17-position a substituent such as

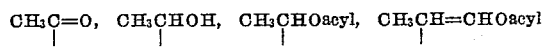

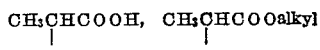

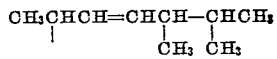

groups attached at two points of the D ring viz.

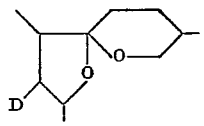

and so forth. It should be noted that the dehydration is peculiarly specific to the C14 hydroxyl, C15 hydrogen groups; OH and hydrogen elsewhere in the molecule are surprisingly untouched.

If desired, the 11-keto, 14-hydroxy compounds may also be treated according to certain other cortisone-synthesis reactions, before removing the 14-hydroxyl group. Thus, if a 6,8-nuclear unsaturated-11-keto-14-hydroxy steroid compound is prepared by the rearrangement, the 6,7-double bond may be selectively reduced by contacting the compound with hydrogen in the presence of a Raney nickel catalyst, as described in a copending application by Gerald D. Laubach, Serial No. 269,587, filed February 1, 1952. An inert organic solvent, such as ethanol, dioxane, ethyl acetate, benzene, ether and so forth may be used in this reduction. The temperature should generally be about 20 to 50° C., and the operation usually proceeds with sufficient speed at room temperature. A hydrogen pressure of about one to about five atmospheres is suitable, and the selective saturation is normally completed within a few hours. The C8-double bond and any unsaturated grouping in the side chain at the 17-position of the steroid nucleus, for example, an alkenyl group, a keto group, and so forth, are not affected by the reduction. Furthermore and especially unusual, the keto group at the 11-position and the 14-hydroxy substituent are not attacked.

As an alternative to the Raney nickel reduction, a noble metal catalyst like palladium or platinum may be used in an inert organic solvent under approximately the same conditions. The solvents previously listed are also quite suitable for this reaction. Here, as in the Raney nickel reaction, the C8-double bond, the 14-hydroxy and the 11-keto group are not affected by the reduction. However, if a double bond exists in the C17 side chain, e. g. between the 22 and 23 carbons, this group is reduced.

If the noble metal catalytic hydrogenation is effected under acidic conditions, there is formed the corresponding nuclear saturated 11-keto compound unsubstituted at the 14-position. As in the other operations above described, the 11-keto group and the presence at the 3-position of an hydroxyl group or a group readily hydrolyzable to hydroxyl, in no way interfere with the reduction. If a keto group is present at the 3-position, it will be reduced to a β-hydroxyl group. This, of course, is not detrimental since the hydroxyl may be reconverted to keto at a later stage. The compound used as starting material may be dissolved in acetic acid or in a mixture containing a major proportion of acetic acid in an inert organic solvent. Other organic acids of comparable acidity may be used. Alternatively, a minor proportion of a strong organic or inorganic acid, for example, p-toluenesulfonic acid, trichloracetic acid, hydrochloric acid, sulfuric acid, phosphoric acid, and so forth, may be used with an inert organic solvent as the medium for the reduction. Such a process is taught in the copending application by Laubach, Serial No. 276,050 filed March 11, 1952, as applied to 8(14)-unsaturated steroids.

In a valuable third phase of this invention, which has been hereinbefore briefly mentioned, the 8,14-unsaturated-11-keto steroids obtained by dehydration of the alkali-converted products can be selectively saturated at the 14,15-double bond. The reduction is accomplished by contacting the steroid with hydrogen, especially in the presence of a noble metal catalyst (e. g. palladium, platinum) under non-acidic conditions. Solvents, hydrogen pressures, temperatures and similar operating factors may be generally like those described in connection with selective hydrogenation of the 11-keto 14-OH compounds. The 14,15-double bond and any double bond at the 22,23-position or the 6,7-position, if present, are reduced under the neutral conditions of reaction. This yields a product having an 8,9-unsaturated-11-keto steroid structure and generally saturated in the D ring. If acidic conditions are used, there is formed a nuclear saturated 11-keto steroid compound as previously described. In these reactions an unsaturated group other than one containing a carbon-carbon double bond in a side chain at the 17-position is in no way affected by the reaction. This also applies to the presence of an hydroxyl group or a group readily hydrolyzable to an hydroxyl at the 3-position of the nucleus. A 3-keto group may be partially reduced under the conditions used, but this is not a drawback. A protected 3-keto group (e. g. ketal, dioxolane) will not be affected. The reactions may be illustrated by the application of the dehydration and hydrogenation reactions to ergosta-6,8,22-triene-11-one-3β,14-diol 3-acetate as shown in the following diagram.

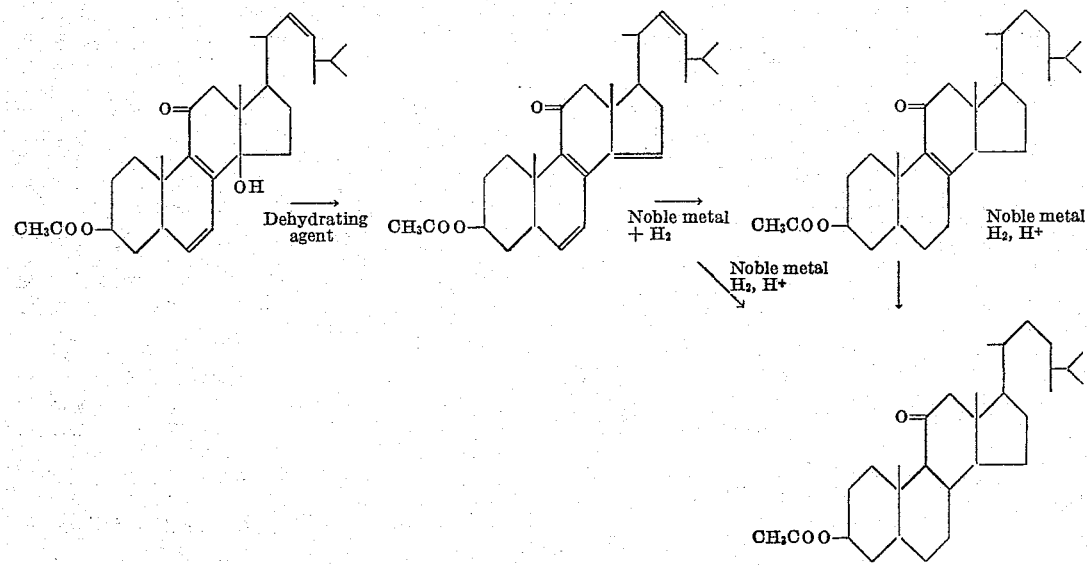

The following examples are given by way of illustration and are not to be considered as the only manner in which this invention may be embodied. It is to be understood that protection hereof is only to be limited by the specific wording of the appended claims.

EXAMPLE I

*Preparation of ergosta-6,8,22-triene-11-one-3β,14-diol 3-acetate*

A solution of one gram of isodehydroergosteryl acetate 11,14-peroxide in 300 milliliters of 0.2-Normal sodium methoxide in methanol was allowed to stand for one hour at room temperature. The mixture was diluted with 500 milliliters of ether and it was then extracted three times with 100-milliliter portions of water. The ether solution was dried over anhydrous sodium sulfate, and it was then evaporated to dryness under vacuum. 742 milligrams of light colored solid product was obtained. This material contains some unreacted peroxide in addition to the product. The peroxide and product were separated by chromatography. The purified product weighed 170 milligrams.

EXAMPLE II

*Preparation of ergosta-6,8,22-triene-11-one-3β,14-diol 3-acetate*

A solution of 2.0 grams of isodehydroergosteryl acetate 11,14-peroxide in 250 milliliters of tertiary butyl alcohol containing 10 milliliters of 0.25-Normal potassium tertiary butoxide was refluxed for two hours under an atmosphere of dry nitrogen. The mixture was then cooled and diluted with 250 milliliters of ether. The ether solution was extracted three times with 150-milliliter portions of water. The ether solution was dried over sodium sulfate and evaporated to dryness under vacuum to obtain 2.0 grams of solid material. To assist in purification, the product was acetylated with acetic anhydride in pyridine. The acetylated product was chromatographed on 40 grams of Florisil. Some peroxide was recovered together with 648 milligrams of the desired product displaying the usual ultraviolet absorption maximum at about 308 mμ. The infrared spectrum was identical with other samples.

EXAMPLE III

*Preparation of ergosta-6,8,22-triene-11-one-3β,14-diol 3-acetate*

A solution of 1.0 gram of isodehydroergosteryl acetate 11,14-peroxide in 50 milliliters of methanol containing 1.4 grams of potassium bicarbonate which was added as a saturated aqueous solution was boiled under reflux for three hours. Solvents were removed under vacuum and the residual product was extracted with a mixture of 50 milliliters of water and 50 milliliters of ether. The organic solvent phase was separated and washed twice with small volumes of water. After drying the ether solution over anhydrous sodium sulfate, it was evaporated to dryness under vacuum. The crude product was chromatographed and, in addition to some recovered peroxide, 277 milligrams of the desired ketone was obtained.

EXAMPLE IV

*Preparation of ergosta-6,8,22-triene-11-one-3β,14-diol 3-acetate*

A solution of 0.549 gram of isodehydroergosteryl acetate 11,14-peroxide dissolved in 50 milliliters of a mixture of 75% petroleum ether (boiling point 30–60° C.) and 25% benzene was placed in a column containing 16 grams of Brockmann chromatographic alumina. The mixture was allowed to stand for three hours at room temperature. The column was then washed several times with small volumes of benzene. A total of 0.16 gram of the peroxide starting material was recovered from the benzene solution. The column was then eluted with a mixture of equal volumes of diethyl ether and benzene. After removal of the solvent, 0.33 gram of white crystalline solid was obtained. This material displayed an absorption maximum of 308 mμ in the ultraviolet region (ether solution). The product was dissolved in 4–5 milliliters of methanol and a small amount of insoluble material was filtered. The solution was cooled to obtain a white crystalline product melting at 166–180 C. This material was again recrystallized from an ether-petroleum ether mixture. There was obtained a crop of white, hair-like needles having a melting point of 188.8–192.4° C. The compound had an ultraviolet absorption maximum of log ϵ=3.84 at 308 mμ (ether solution).

*Analysis.*—Calcd. for $C_{30}H_{45}O_4$: C, 76.72; H, 9.65. Found: C, 76.72; H, 9.31.

This product displayed adsorption bands in the infrared at 2.8, 6.08 and 6.18 microns. These bands are characteristic of a keto group conjugated with a double bond and of a non-associated hydroxyl group.

EXAMPLE V

*Preparation of ergosta-8-ene-11-one-3β,14-diol 3-acetate*

A solution of 0.115 gram of the crude ergosta-6,8,22- triene-11-one-3β,14-diol 3-acetate product in 10 milliliters of ethanol was stirred with 0.20 gram of 5% palladium-on-charcoal catalyst. The mixture was subjected to a pressure of one atmosphere of hydrogen over a period of two hours. 125% of the theoretical two moles of hydrogen was absorbed before uptake ceased. The filtered solution was concentrated and the solid product was triturated with methanol. A white crystalline product having a melting point of 162–165° C. was obtained. The structure of the product, i. e. the fact that the 6,7-double bond had been selectively removed, was confirmed by observation of the ultraviolet and infrared absorption spectra of the compound. The material showed an absorption in the ultraviolet of log $\epsilon=3.72$ at 245 m$\mu$. In the infrared, absorption maxima were observed at 2.8, 5.8 and 6.0 microns.

EXAMPLE VI

*Preparation of ergosta-6,8,14,22-tetraene-11-one-3β-ol*

Crude ergosta-6,8,22-triene-11-one-3β,14-diol 3-acetate (melting point 175°–182° C.) weighing 1.0 gram was dissolved in 230 milliliters of methanol containing 14 milliliters of concentrated hydrochloric acid. The mixture was refluxed for ten minutes. The reaction mixture was then cooled to 0° C. and the acid was neutralized with 150 milliliters of cold, saturated sodium bicarbonate solution. A flocculent yellow precipitate formed. This material was filtered, washed with water and dried. It weighed 0.89 gram. The product was recrystallized from methanol. It melted at 142.0° to 145.6° C. $[\alpha]_D^{25}=-68.7°$ (1% in chloroform). The ultraviolet absorption spectrum of the compound was found to be as follows:

$\epsilon$ at 325 m$\mu$=8850
$\epsilon$ at 233 m$\mu$=16,500

The product was analyzed and found to have the following composition.

*Analysis.*—Calcd. for $C_{28}H_{40}O_2$: C, 82.30; H, 9.87. Found: C, 82.09; H, 10.01.

EXAMPLE VII

*Preparation of ergosta-6,8,14,22-tetraene-11-one-3β-ol acetate*

The procedure used in Example VI was followed exactly, except that the crude 3-hydroxylated compound was acetylated by adding the dry product to a mixture of 30 milliliters of acetic anhydride and 20 milliliters of pyridine. The mixture was allowed to stand for 16 hours at 30° C. and it was then poured into 50 grams of finely divided ice. The product was extracted with ether and the ether extract was washed with saturated sodium bicarbonate solution and then with water. The solvent was removed under vacuum and the resulting product was triturated with water and then with 50% methanol. A crystalline product weighing 0.87 gram (90.5% yield) was obtained. This product melted at 138.2° to 142.0° C. A sample was repurified for analysis by crystallization from methanol. The product then melted at 145.0° to 146.8° C. The optical rotation of this product is $[\alpha]_D^{25}=-82.2°$ (1.12% in chloroform). The ultraviolet absorption spectrum for the compound was determined. Two maxima occur:

$\epsilon$ at 233 m$\mu$=16,500
$\epsilon$ at 326 m$\mu$=8,850

The compound displayed maxima in the infrared absorption spectrum at 5.76, 6.04 and 6.19 $\mu$.

*Analysis.*—Calcd. for $C_{20}H_{42}O_3$: C, 79.95; H, 9.40. Found: C, 79.72; H, 9.54.

EXAMPLE VIII

*Preparation of ergosta-8,14,22-triene-11-one-3β-ol acetate*

Crude ergosta-8,22-diene-11-one-3β,14-diol 3-acetate (melting point 165.4° to 172.8° C., $\epsilon$ at 243 m$\mu$=5150) weighing 0.62 gram was added to 25 milliliters of methanol containing 1.5 milliliters of concentrated hydrochloric acid. The mixture was refluxed for ten minutes. A mixture of 30 milliliters of distilled water and 15 grams of crushed ice was added. The mixture was cooled in ice and the solid that separated was filtered. The product was washed with water and dried. The pale yellow crystalline material weighed 0.50 gram and had a melting point of 115.0° to 121.8° C. ($\epsilon$ at 290 m$\mu$=9050). The crude compound was purified by chromatography on a column containing 15 grams of alumina. A fraction eluted from the column with a mixture of benzene and ether containing between 5 and 15% of the latter solvent weighed 0.290 gram. This represents a 55% yield of the desired product as colorless crystals. The material was recrystallized from methanol to obtain a sample for analysis. This product melted at 149.6° to 150.8° C. It had an optical rotation of $[\alpha]_D=+11.9°$. The ultraviolet absorption spectrum showed a maximum having at 290 m$\mu$=11,600.

*Analysis.*—Calcd. for $C_{28}H_{42}O_2$: C, 81.90; H, 10.31. Found: C, 81.74; H, 10.17.

EXAMPLE IX

*Preparation of ergosta-6,8,14,22-tetraene-11-one-3β-ol acetate*

Ergosta-6,8,22-triene-11-one-3β,14-diol 3-acetate was dissolved in glacial acetic acid. A crystal of iodine was added to the solution. The mixture was allowed to stand overnight at room temperature. In the morning the solution was diluted with ice and water and the crystalline product that separated was filtered, washed with cold water and dried. An excellent yield of the desired 14-unsaturated steroid compound was obtained. No hydrolysis of the 3-acetoxy group occurred.

EXAMPLE X

*Preparation of ergosta-8-ene-11-one-3β-ol acetate*

A solution of 0.200 gram of ergosta-6,8,14,22-tetraene-11-one-3β-ol acetate (melting point 141.4°–144.6° C.) in 15 milliliters of ethanol was hydrogenated in the presence of 0.2 gram of 5% palladium-on-charcoal catalyst. After agitation of the mixture for 70 minutes under approximately one atmosphere of hydrogen pressure, 30.9 milliliter (94% of 3 moles) of hydrogen had been absorbed. No further uptake of hydrogen was observed. The solution was filtered and concentrated under vacuum. The product obtained was recrystallized from methanol. It weighed 0.50 gram and had a melting point of 128.5° to 133.0° C. The second recrystallization of the product with methanol raised the melting point to 132.0° to 137.0° C. The product showed no depression of melting point when mixed with a sample obtained by another method. The optical rotation of this compound is $[\alpha]_D^{25}=+101.5°$ (0.5% in chloroform). The compound displayed an absorption maximum in the ultraviolet at 248 m$\mu$ ($\epsilon=10,590$).

EXAMPLE XI

*Preparation of 8,9-isoergostan-11-one-3β-ol acetate*

A solution of 0.236 gram of ergosta-8,22-diene-11-one-3β,14-diol 3-acetate (melting point 172.0°–182.0° C.) in 10 milliliters of acetic acid was mixed with 0.200 gram of 5% palladium-on-charcoal catalyst. The mixture was agitated under one atmosphere pressure of hydrogen at room temperature. After the reaction had proceeded overnight, it was found that nearly 4 moles of hydrogen had been absorbed. The solution was filtered and the solvent was removed under vacuum. The crude product was purified by chromatography on a column of 3.0 grams of alumina. By elution of the column with benzene-petroleum ether mixtures and pure benzene, a total of 100.5 milligrams of a white crystalline product, melting at 120.0°–150.0° C., was obtained. This material was recrystallized from methanol in the form of long needles with a melting point of 148.5°–151.2° C. Further recrystallization from methanol raised the melting point to 160.0°–161.8° C. The melting point of this material was undepressed by a sample prepared from another method.

*Analysis.*—Calcd. for $C_{30}H_{50}O_3$: C, 78.55; H, 10.99. Found: C, 78.64; H, 10.97.

EXAMPLE XII

*Preparation of 8,9-isoergostan-11-one-3β-ol acetate*

A solution of 0.226 gram of ergosta-8,22-diene-11-one-3β-ol acetate (prepared by the method of Heusser, Helv. Chim. Acta, vol. 34, p. 2106 (1951)) in 10 milliliters of pure glacial acetic acid was mixed with 0.200 gram of 5% palladium-on-charcoal catalyst. The mixture was stirred under one atmosphere of hydrogen at room temperature. In two hours 25.8 milliliters (105% of 2 moles) of hydrogen had been absorbed by the mixture. No further absorption of hydrogen was observed. The solution was filtered and the filtrate was concentrated under vacuum. A white solid melting at 121.0°–150.0° C. was obtained. The crude product was purified by chromatography on alumina. Elution of the column with petroleum etherbenzene and benzene yielded a crystalline product weighing 128.2 milligrams. It melted at 134.0°–159.0° C. On recrystallization from methanol a product melting at 162.3°–163.6° C. was obtained. This product had an optical rotation of $[\alpha]_D^{25} = -4.3$ (1% in chloroform).

*Analysis.*—Calcd. for $C_{30}H_{50}O_3$: C, 78.55; H, 10.99. Found: C, 78.31; H, 10.89.

EXAMPLE XIII

*Preparation of ergosta-8-ene-11-one-3β-ol acetate*

A solution of ergosta - 8,14,22-triene - 11 - one-3β-ol acetate in ethanol was reduced by agitation under one atmosphere hydrogen pressure at room temperature in the presence of palladium-on-charcoal catalyst. Uptake of hydrogen ceased when practically the theoretical amount had been absorbed. The catalyst was filtered and the product was recovered by concentration of the solvent. A purified sample melted at about 132–137° C. The optical rotation and ultraviolet absorption of the product was the same as the product obtained by the method of Example X.

What is claimed is:

1. A process for the preparation of an 8-unsaturated-11-keto steroid compound which comprises contacting an 8-unsaturated steroid 11, 14-peroxide of the ergostane series with an inorganic alkaline material.
2. A process for the preparation of an 8-unsaturated-11-keto steroid compound which comprises contacting an 8-unsaturated steroid 11, 14-peroxide of the ergostane series with an alkaline agent chosen from the group consisting of a solution of an alkali metal in a lower alkanol, an alkali metal bicarbonate, an alkali metal carbonate, an alkali metal hydroxide and activated lumina.
3. A process for the preparation of an 8-unsaturated-11-keto steroid compound which comprises contacting an 8-unsaturated steroid 11, 14-peroxide of the ergostane series with activated alumina.
4. A process for the preparation of an 8-unsaturated-11-keto steroid compound which comprises contacting an 8-unsaturated steroid 11, 14-peroxide of the ergostane series with a solution of sodium in methanol.
5. A process for the preparation of an 8-unsaturated-11-keto steroid compound which comprises contacting an 8-unsaturated steroid 11, 14-peroxide of the ergostane series with a solution of potassium in tertiary butyl alcohol.
6. A process for the preparation of an ergosta-6,8,22-triene-11-one-3β,14-diol 3-ester which comprises contacting an ergosta-6,8,22-triene-3β-ol ester 11,14-peroxide with an alkaline agent chosen from the group consisting of a solution of an alkali metal in the lower alkanol, an alkali metal bicarbonate, an alkali metal carbonate, an alkali metal hydroxide and activated alumina.
7. A process for the preparation of an 8,14-unsaturated-11-keto steroid compound which comprises contacting an 8-unsaturated steroid 11, 14-peroxide of the ergostane series with an inorganic alkaline material and dehydrating the so-produced 11-keto-14-hydroxy steroid compound.
8. A process for the preparation of an 8-unsaturated-11-keto steroid compound which comprises contacting an 8-unsaturated steroid 11, 14-peroxide of the ergostane series with an inorganic alkaline material, dehydrating the so-produced 11-keto-14-hydroxy steroid compound, and contacting the so-produced 8,14-unsaturated-11-keto steroid compound with hydrogen in the presence of a hydrogenation catalyst selected from the class consisting of noble metals and Raney nickel.
9. A process for the preparation of an 8,14-unsaturated-11-keto steroid compound which comprises contacting an 8-unsaturated-11-keto-14-hydroxy steroid compound of the ergostane series with an acidic dehydrating agent.
10. A process for the preparation of an 8-mono-unsaturated-11-keto steroid compound which comprises contacting an 8,14-di-unsaturated-11-keto steroid compound of the ergostane series with hydrogen in the presence of a hydrogenation catalyst selected from the class consisting of noble metals and Raney nickel.
11. Compounds selected from the class consisting of ergosta-8,22-diene-11-one-3β,14-diol, its 3-acetate, 3-propionate and 3-butyrate esters, and its 3-methyl, 3-ethyl and 3-benzyl ethers.
12. Compounds selected from the class consisting of ergosta-6,8,22-triene-11-one-3β,14-diol, its 3-acetate, 3-propionate and 3-butyrate esters, and its 3-methyl, 3-ethyl and 3-benzyl ethers.
13. Compounds selected from the class consisting of ergosta-6,8,14,22-tetraene-11-one-3β-ol, its 3-acetate, 3-propionate and 3-butyrate esters, and its 3-methyl, 3-ethyl and 3-benzyl ethers.
14. Compounds selected from the class consisting of ergosta-8,14,22-triene-11-one-3β-ol, its 3-acetate, 3-propionate and 3-butyrate esters, and its 3-methyl, 3-ethyl and 3-benzyl ethers.

References Cited in the file of this patent

FOREIGN PATENTS 522,870  Great Britain _____ Jan. 28, 1940